United States Patent
Buckley

(10) Patent No.: US 9,410,847 B2
(45) Date of Patent: Aug. 9, 2016

(54) SECURITY DEVICE WITH A FULL LENGTH LENS

(71) Applicant: Honeywell International Inc., Morristown, NJ (US)

(72) Inventor: Mark C. Buckley, Camino, CA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/565,976

(22) Filed: Dec. 10, 2014

(65) Prior Publication Data

US 2016/0169743 A1    Jun. 16, 2016

(51) Int. Cl.
| | | |
|---|---|---|
| *G02B 1/04* | (2006.01) |
| *G02B 7/02* | (2006.01) |
| *G01J 5/00* | (2006.01) |
| *G02B 3/08* | (2006.01) |
| *G01J 5/34* | (2006.01) |

(52) U.S. Cl.
CPC .............. *G01J 5/0025* (2013.01); *G01J 5/34* (2013.01); *G02B 1/041* (2013.01); *G02B 3/08* (2013.01); *G02B 7/022* (2013.01)

(58) Field of Classification Search
CPC .......... G01J 5/0025; G01J 5/34; G02B 1/041; G02B 3/08; G02B 7/022
See application file for complete search history.

(56) References Cited

U.S. PATENT DOCUMENTS

| | | | | |
|---|---|---|---|---|
| 4,795,908 A | * | 1/1989 | Morimoto | G08B 13/19 250/342 |
| 5,393,978 A | * | 2/1995 | Schwarz | G08B 19/005 250/342 |
| 2006/0267566 A1 | * | 11/2006 | Williams | H05B 37/0218 323/282 |

* cited by examiner

*Primary Examiner* — Mark R Gaworecki
(74) *Attorney, Agent, or Firm* — Husch Blackwell LLP

(57) ABSTRACT

A security device is disclosed, wherein the security device includes a Fresnel lens covering the entire face of the device, a housing, and a pyroelectric detector. The center portion of the Fresnel lens, which contains the Fresnel lens elements, is molded flat, its edges are molded in the final installed form, and its edges contain appendages that secure the lens on the device so there are no gaps between the lens and the device.

16 Claims, 11 Drawing Sheets

SECURITY DEVICE WITH A FULL LENGTH LENS

FIELD

This application relates to a security device. More particularly, this application describes a security device having a Fresnel lens that covers the entire front face of the device.

BACKGROUND

Security devices can detect events such as temperature fluctuation, movement, impact, and shock. A passive infrared sensor (PIR) is one type of security device that detects motion as it measures infrared (IR) energy radiating from objects in its field of view in conjunction with a pyroelectric detector and Fresnel lens array as the objects move in and out of the multiple detection zones created by the sensing elements in the pyroelectric detector and the multiple Fresnel elements in the array molded into the Fresnel lens. IR energy enters the security device through the front of the device, known as the "sensor face." The sensor face of traditional security devices includes a front cover, which is an opaque cylindrical plastic shield comprising the greater portion of the face of the device, where the shield has a small window or opening. The window overlays a cylindrical Fresnel lens, which is an IR transparent polymer material. The Fresnel lens is comprised of an array of Fresnel lens elements and a border surrounding the array. Normally, the Fresnel lens is molded flat during manufacturing, then bent to fit the cylindrical conformation of the security device when installed. The Fresnel lens is traditionally trapped in place between the edges of the window in the front cover on the front surface and a bug-guard or lens retainer on the interior side. This bending of the Fresnel lens creates considerable residual stresses in the lens, which, if not securely trapped between the front cover and the bug-guard, would lead to the edges lifting up from the sides and corners of the device as the lens tries to return to its original molded flat shape. In a PIR where the lens is to comprise the entire front face of the device, the edges or border of the lens cannot be trapped behind the front cover as it must reside on top of the front cover. It was found that lens retention via the use of hooks and pinned flanges would result in the lifting of the edges, causing gaps or holes in the device wherein dust, bugs, and water can seep in, potentially damaging the device or shortening its lifetime. In addition, the lifting of the edges of the lens can lead to distortions in the detection of IR energy, causing the device to not work properly. Thus, there is a need for a security device that avoids these problems in the prior art. The present device has a unique lens structure and a more robust lens system retention means that reduces the residual stresses on the lens.

BRIEF DESCRIPTION OF THE DRAWINGS

Examples of security devices having a full face lens will now be described and contrasted with conventional devices, with reference to the accompanying drawings, in which.

DETAILED DESCRIPTION

Figure 1:
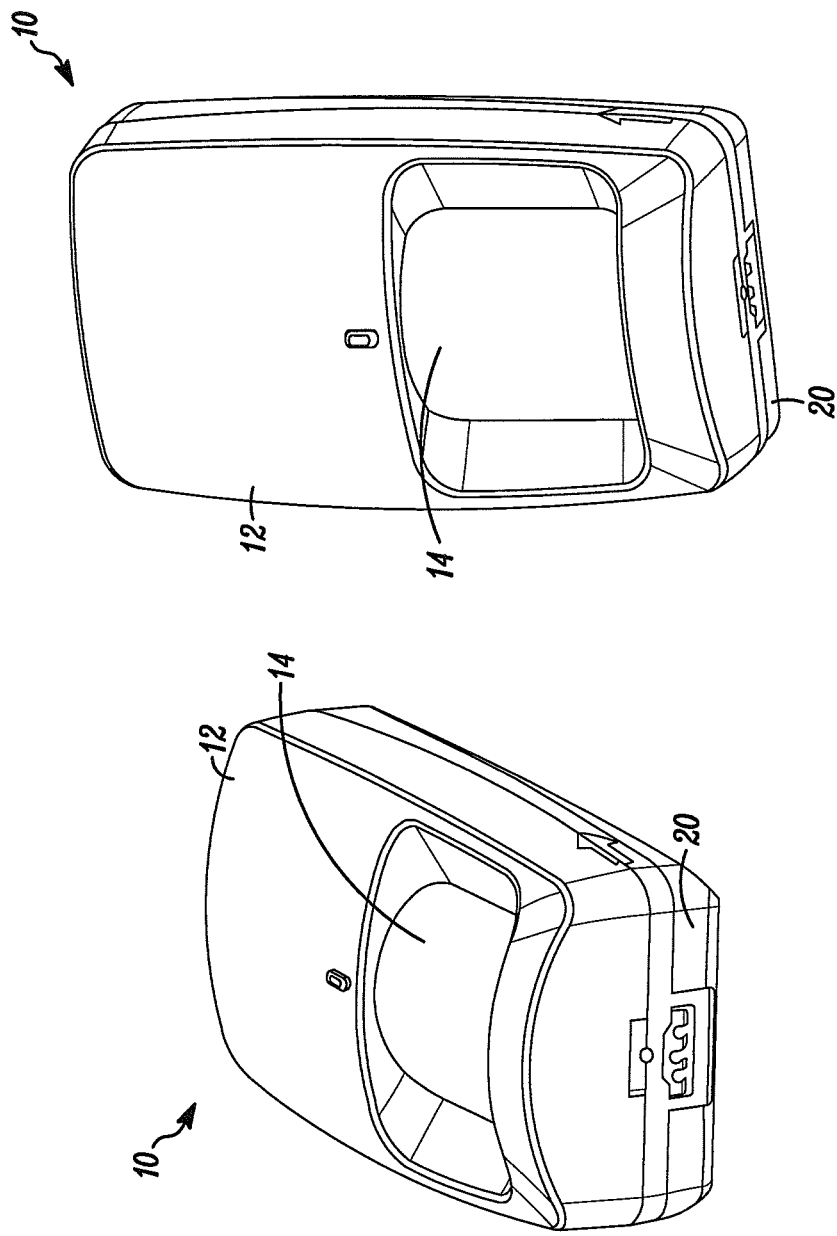
FIG. 1 is a view of a security device typical of the prior art illustrating a front cover, a Fresnel lens and a back cover.
Figure 2:
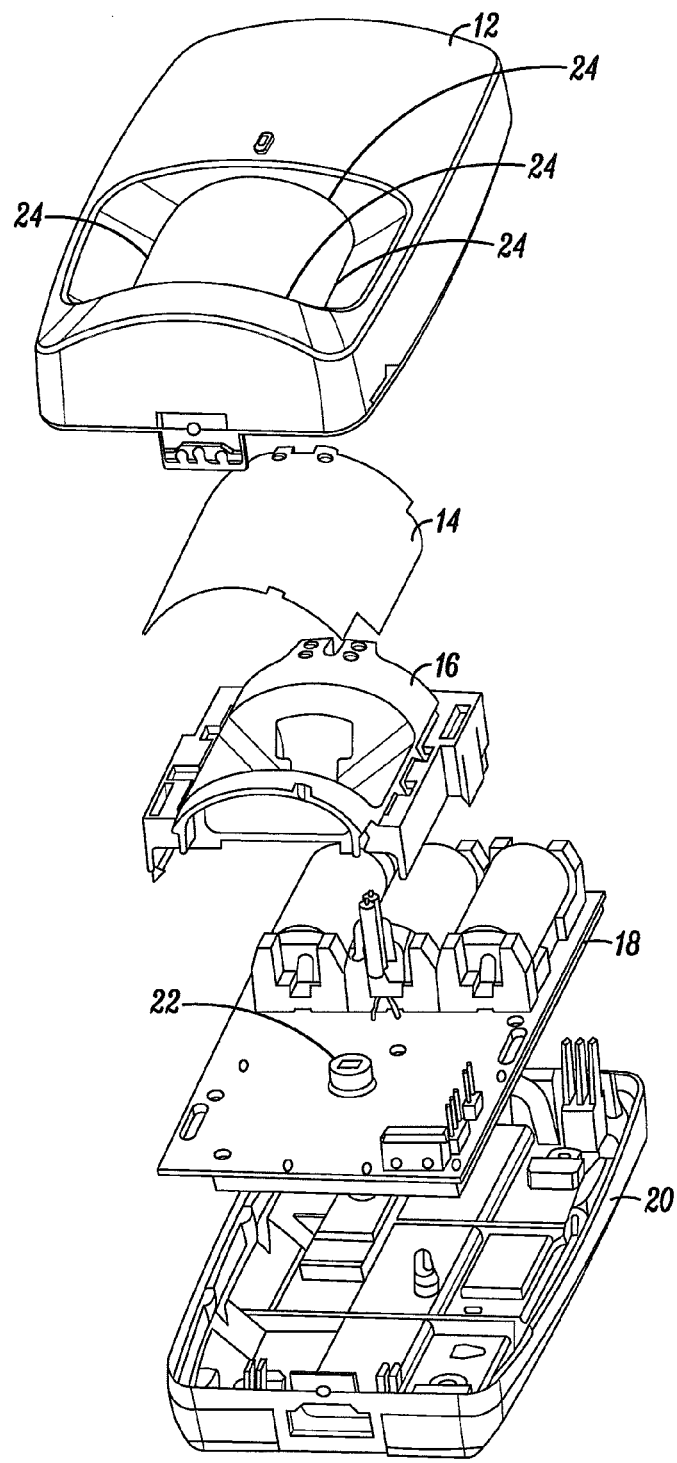
FIG. 2 is an exploded view of the prior art security device of FIG. 1.
Figure 4:
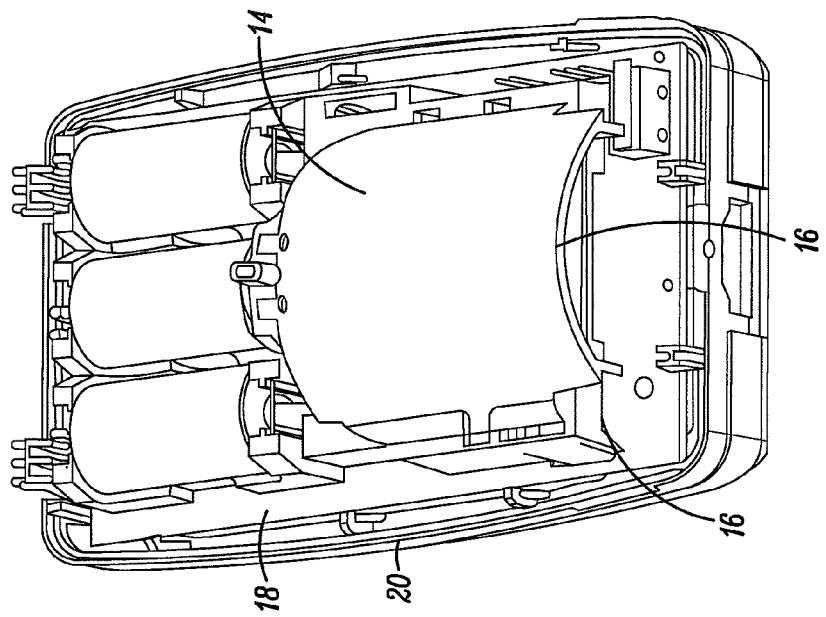
FIG. 4 is a perspective view of the prior art security device of FIG. 1 with the front cover removed illustrating the Fresnel lens as installed on the bug guard.
Figure 3:
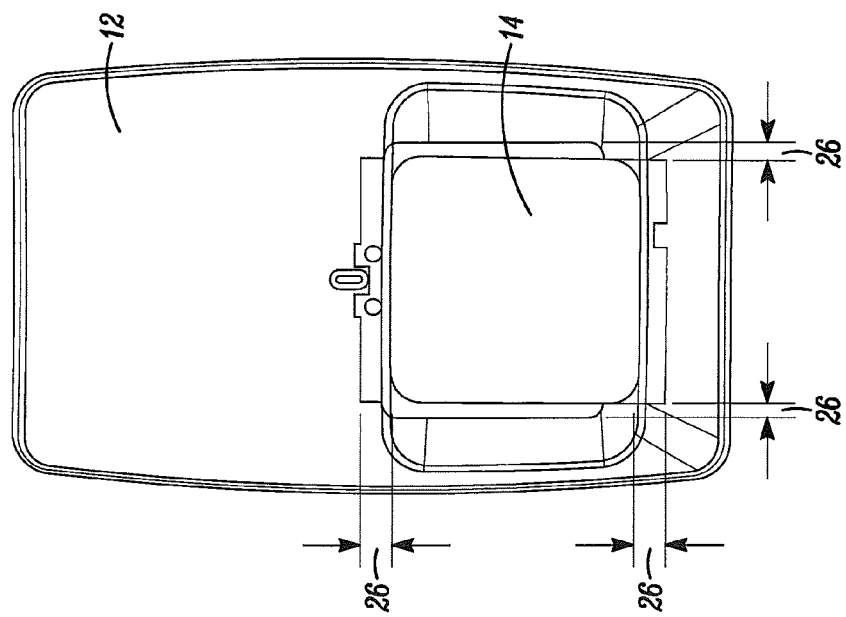
FIG. 3 is a front view of the prior art security device of FIG. 1 illustrating the border region of the Fresnel lens which is trapped by the front cover.
Figure 6:
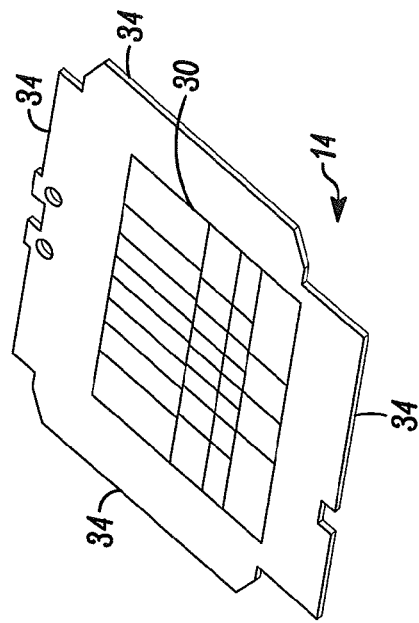
FIG. 6 is a perspective view of the prior art Fresnel lens of FIG. 5 shown in the flat as-molded shape.
Figure 5:
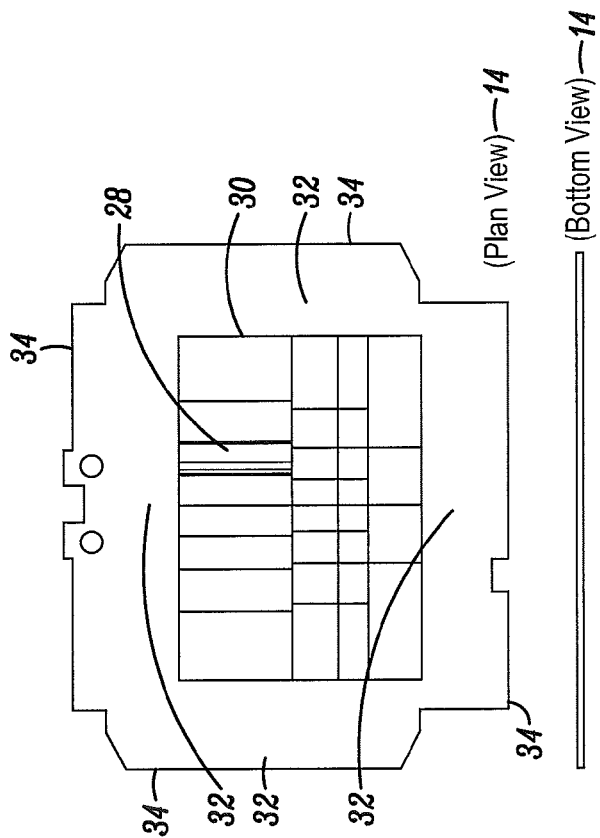
FIG. 5 contains plan and bottom views of the Fresnel lens in the prior art security device of FIG. 1 illustrating the flat molded form and the shape when installed in the device.
Figure 5:
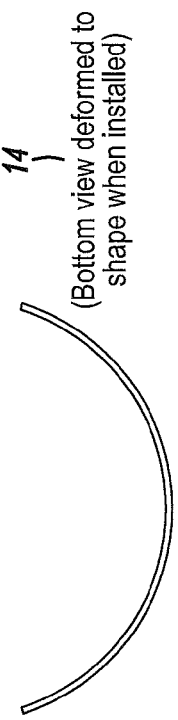
Figure 8:
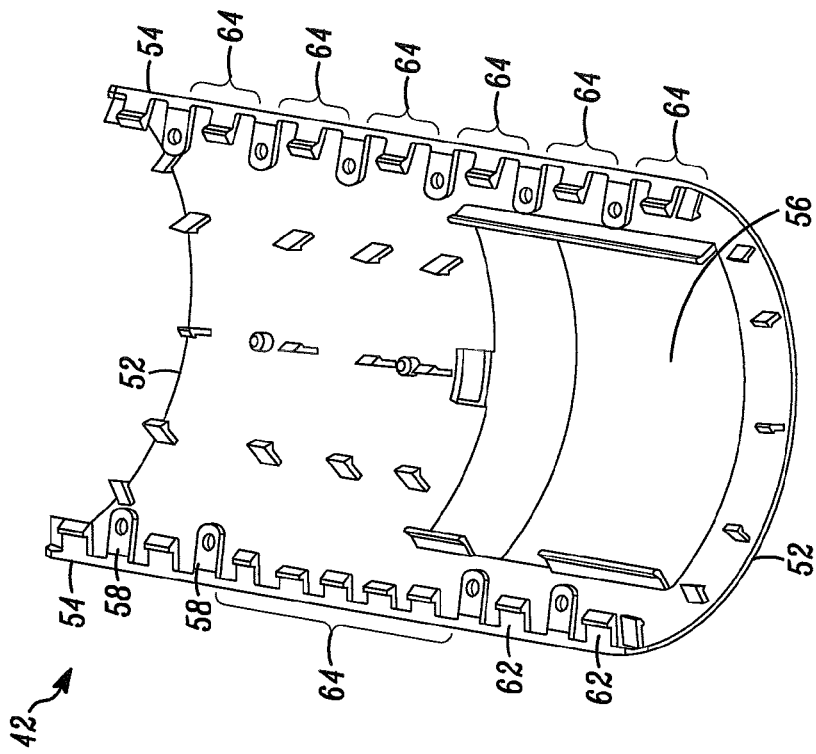
FIG. 8 is a view of the Fresnel lens in the prior version prototype device shown in the as installed cylindrical form.
Figure 7:
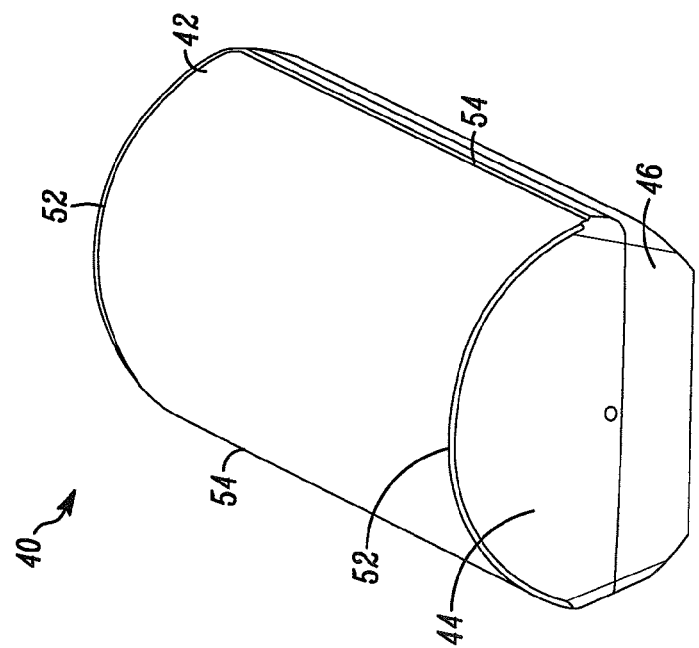
FIG. 7 is a view of a security device illustrating a lens covering the full front face of the device, a front cover and a back cover. The device and lens are a prior version prototype.
Figure 9:
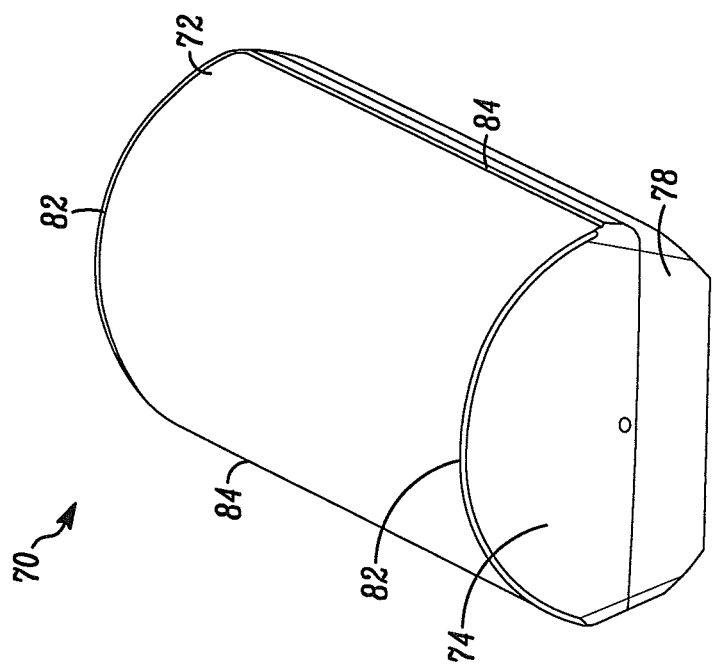
FIG. 9 is a view of a security device illustrating a lens covering the full front face of the device, a front cover and a back cover shown generally in accordance with an illustrated embodiment.
Figure 10:
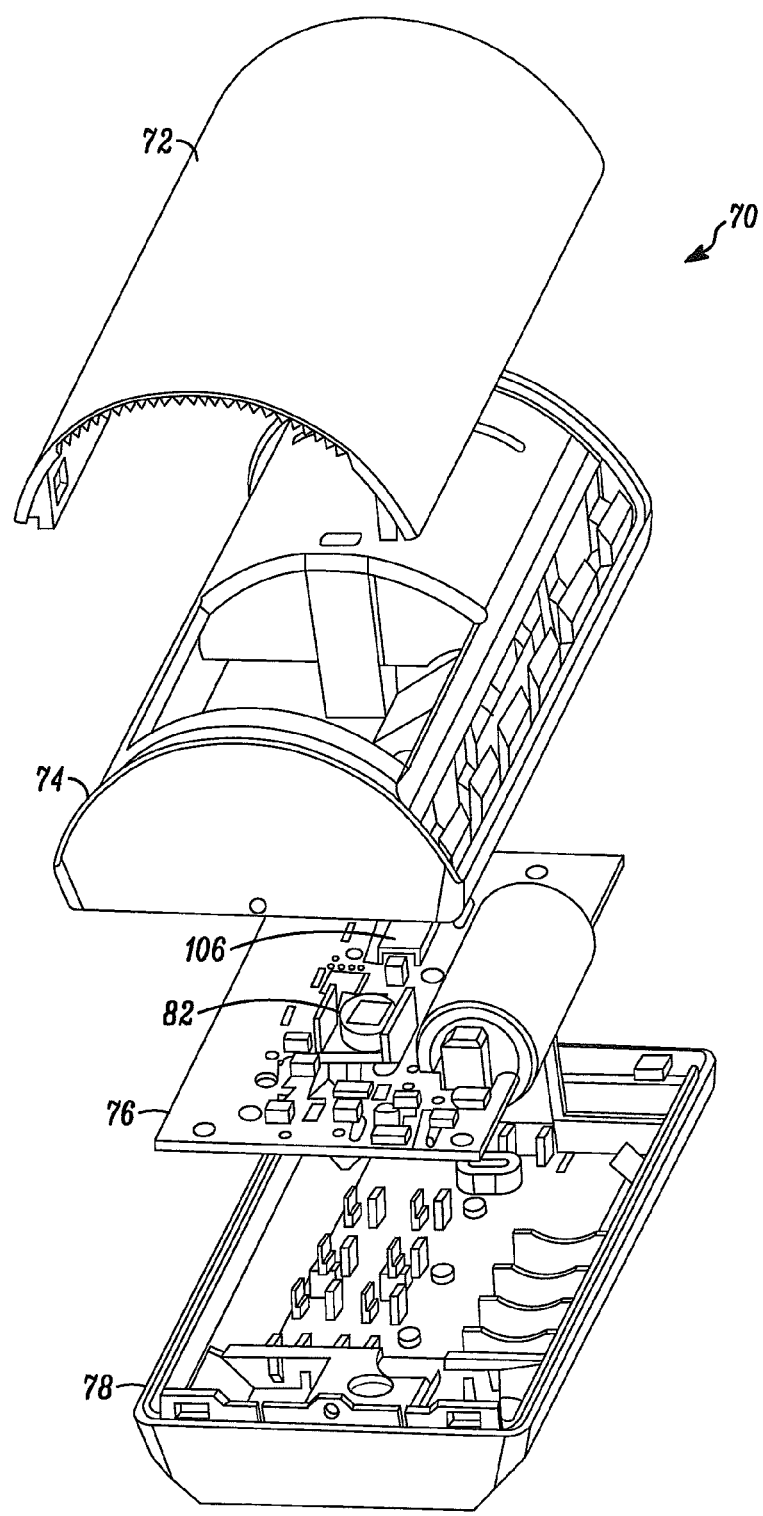
FIG. 10 is an exploded view of the security device of FIG. 9 shown generally in accordance with an illustrated embodiment.
Figure 11:
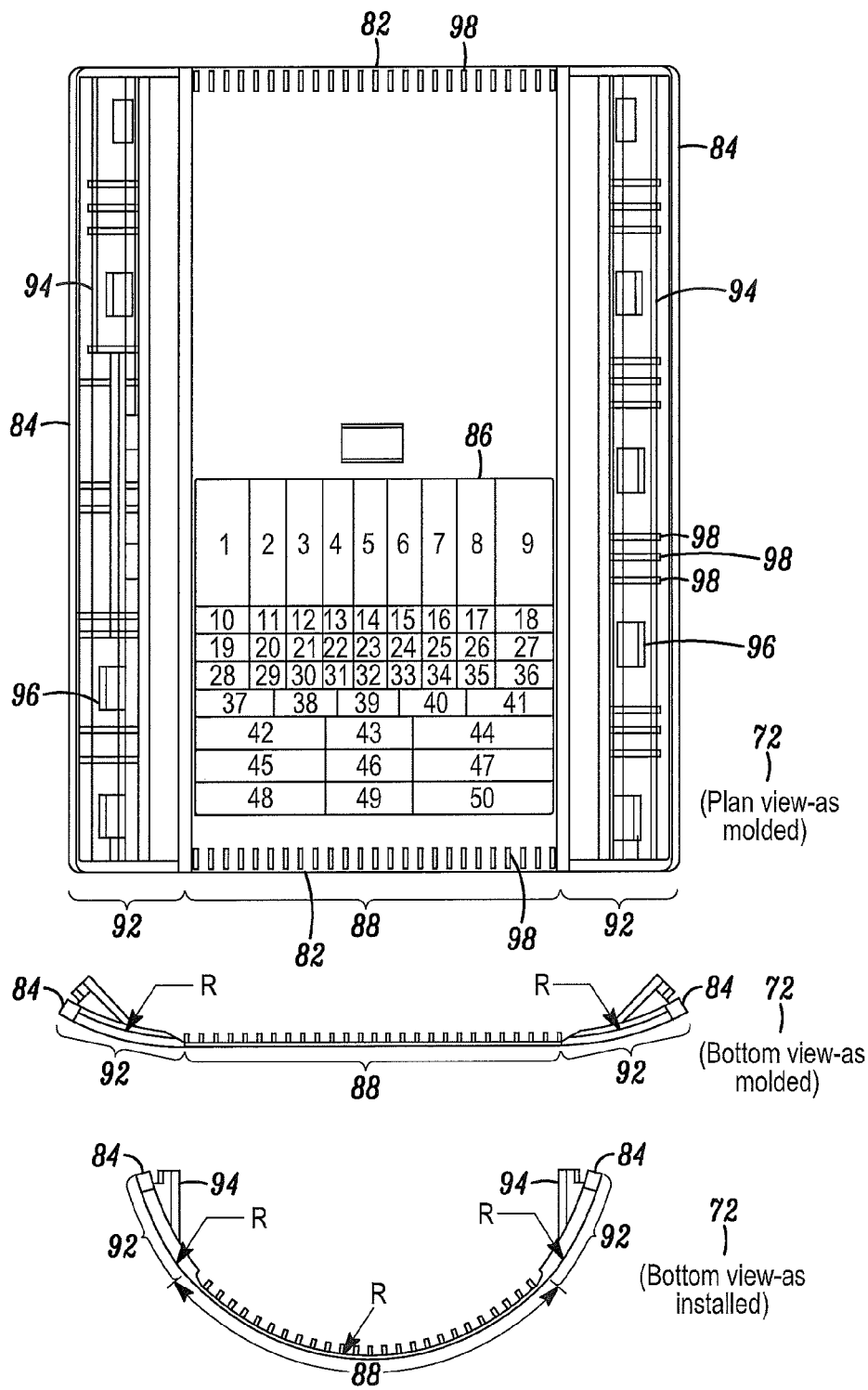
FIG. 11 contains a plan view and bottom view molded flat before attachment to the device and a bottom view as it would appear attached to the device shown generally in accordance with an illustrated embodiment.
Figure 12:
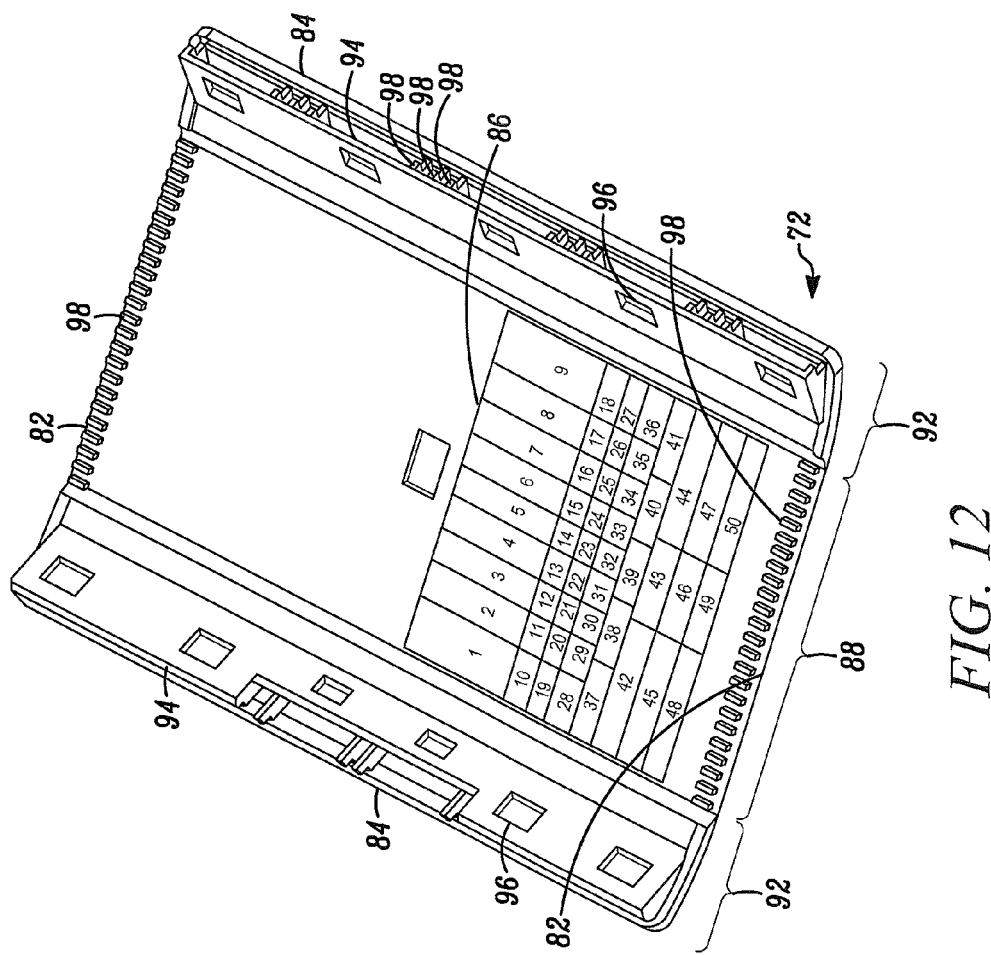
FIG. 12 is a perspective view of the Fresnel lens of FIG. 11 molded flat before attachment to the device shown generally in accordance with an illustrated embodiment.
Figure 13:
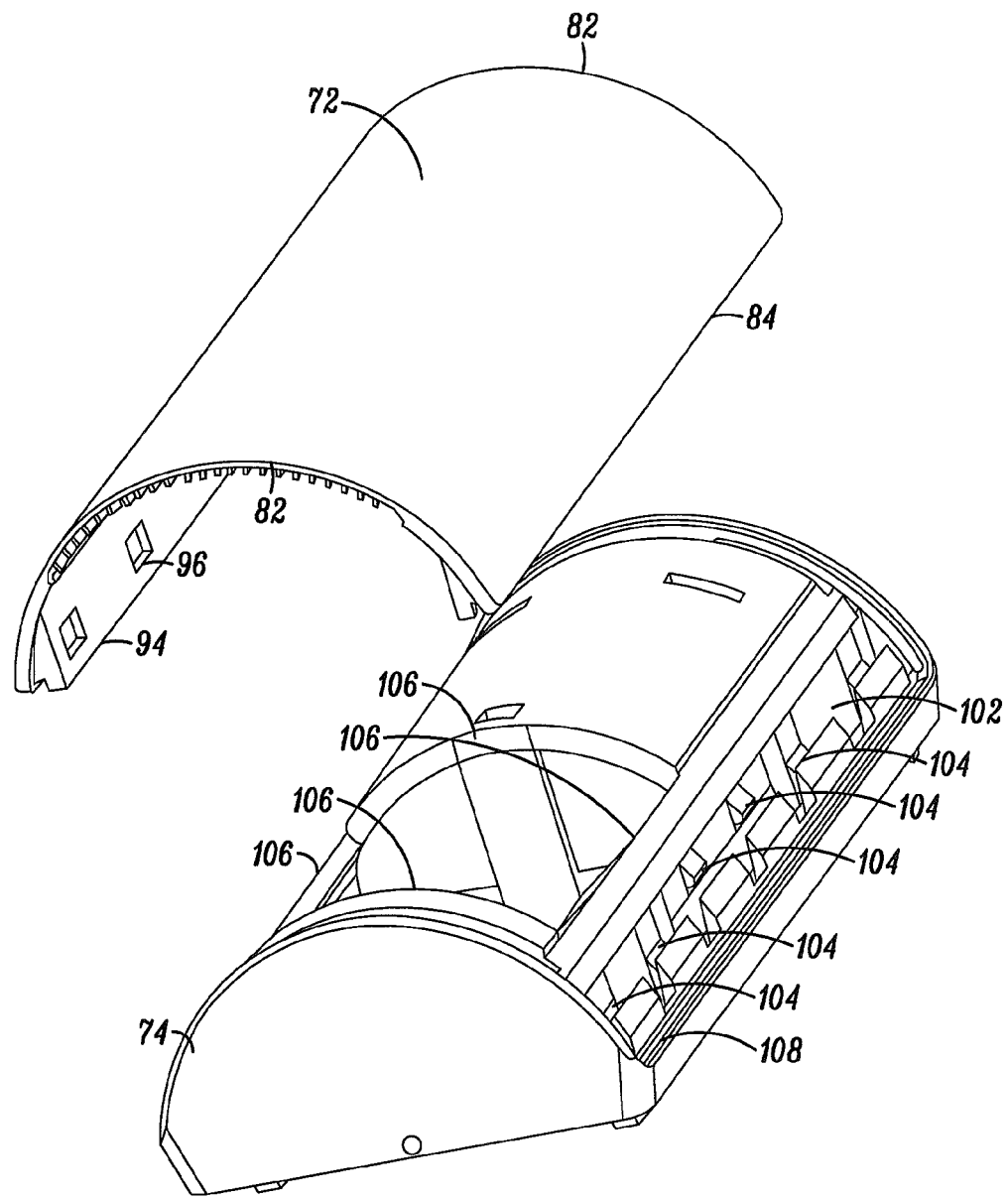
FIG. 13 is a view of a Fresnel lens as it would appear when being attached to the device shown generally in accordance with an illustrated embodiment.
Figure 15:
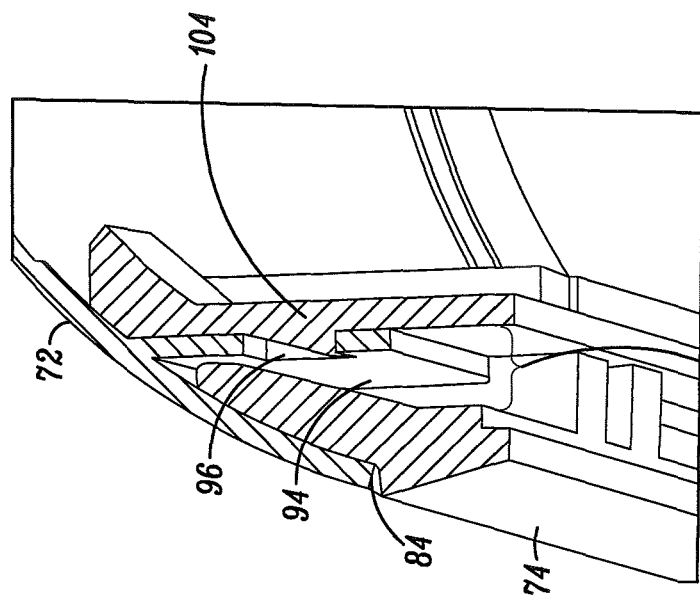
FIG. 15 is an enlarged view of a Fresnel lens locking mechanism, as it would appear when attached to the device shown generally in accordance with an illustrated embodiment.
Figure 14:
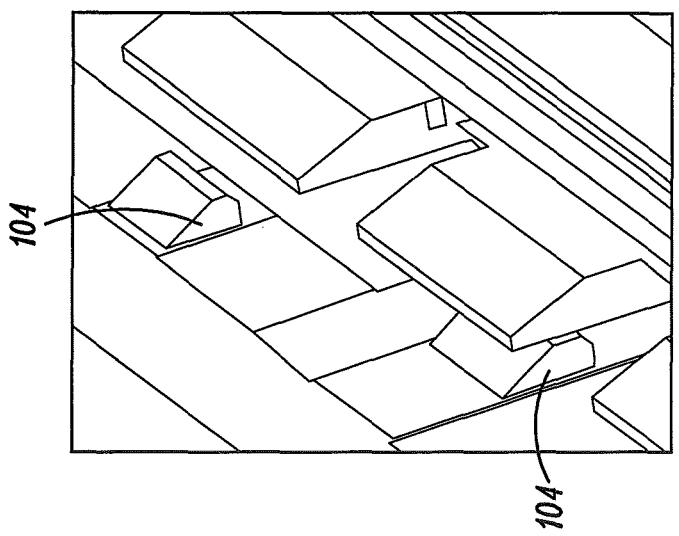
FIG. 14 is an enlargement of a portion of the front cover from FIG. 13 illustrating the retention hooks shown generally in accordance with an illustrated embodiment.

A typical prior art PIR 10 includes a housing made of a front cover 12 and a back cover 20 joined together at their respective edges, a Fresnel lens 14, a bug guard 16, a printed circuit board assembly 18 containing a pyroelectric detector 22 and a microcontroller. The front cover 12, rear cover 20, and bug guard 16 are each unitary parts made of a thermoplastic material which is opaque in the visible and infrared spectra. The Fresnel lens 14 is made of a polymer material that is sufficiently transparent to infrared energy, typically high density polyethylene. The Fresnel lens 14 resides in a window or opening 24 in the front cover 12. This opening permits IR energy to reach the Fresnel lens 14 and be focused onto a pyroelectric detector 22 located behind the Fresnel lens.

The edges 34 of a typical prior art lens 14 are securely contained and not visible once installed in the device as the lens is trapped between the front cover 12 and bug guard 14 and is in contact with each along the lens border 32 which surrounds the array 30 of individual Fresnel elements 28. The front cover overlap of the lens is illustrated as 26. The lens contact area of the front cover 12 and bug guard 16 is cylindrically shaped forcing the lens to take on the same cylindrical shape once installed. The prior art lens is molded flat to insure proper formation of of the many Fresnel facets in individual Fresnel lens element 28.

Today, there is not one security device in the marketplace having a Fresnel lens that covers the entire front face of the device. Challenges with cosmetic and functional issues have not been overcome prior to the invention disclosed herein. A prototype of a version of a security device having a Fresnel lens that covers the entire front face of the device had been created by colleagues of the inventor. This device, PIR 40, includes a lens 42, a front cover 44, a rear cover 46 and a bug-guard (not shown). The edges of the lens 52 and 54 are are visible to a home owner once installed. For cosmetic and functional reasons, these edges must be well controlled and must remain in contact with the front cover 44 with no apparent gaps. This lens, like the prior art lenses, is molded flat to insure the optical integrity of each Fresnel lens element in the array 56, then takes on the cylindrical shape of the front cover when installed. If the left and right edges 54 of the lens 42 are held securely in place over the entire length of the edge, the cylindrical contour will insure that the top and bottom edges 52 of the lens 42 are held in place with no gaps. To this end of controlling the left and right edges 54, multiple pin receiving tabs 58 and hooks 62 were added along these edges. Each of the hooks 62 and tabs 58 are inserted into individual slots in the front cover 44. Performing this task proved to be extremely difficult and not practical from a manufacturing standpoint. A bug guard is then snapped into the front cover/lens assembly. The bug guard contains pins that engage the holes in the lens tabs 58 positively controlling the tabs. This too was found to be difficult as the lens tabs 58 want to move outboard due to residual stresses in the bent lens making alignment of the holes with the bug guard pins cumbersome. Once the bug guard was installed, it was found that the residual stresses in the lens 52 which result from bending the lens into the cylinder shape cause the hooks to disengage and the portion of the left and right lens edges 54 that are between the tabs 64 to pull away from the front cover, producing unsightly gaps. This approach to securing the lens, which is the obvious approach to those versed in the state of the art, proved inadequate.

The present security device solves the longevity problems of prior art devices. The unique lens structure and more robust lens system retention means described herein prolong the life of the device by minimizing gaps in the device at the junction between the lens and the front cover. Manufacturing is also thereby simplified.

The device 70 includes a Fresnel lens 72, a printed circuit board assembly 76 and a housing made of a front cover 74 and a back cover 78 joined together at their respective edges. The front cover 74 is a unitary part which includes an array of Fresnel lens elements 86. The front cover 74 and back cover 78 are each unitary parts complementary in size to the Fresnel lens 72. The front and back covers 74 and 78 are made of a thermoplastic material. The Fresnel lens is made of high density polyethylene. The device 70 also includes a pyroelectric detector 82 within the housing and a microcontroller 106 in contact with the pyroelectric detector 82.

The center portion 88 of the Fresnel lens 72 contains an array 86 of individual Fresnel lens elements. This center portion 88 of the Fresnel lens is molded flat to insure the optical integrity of each facet in each Fresnel lens element in the array 86. The left and right portions 92 of the Fresnel lens 72 extend from the left and right sides of the Fresnel lens array 86 to the left and right sides 84 of the Fresnel lens 72. The left and right portions 92 of the Fresnel lens 72 contain walls 94 containing hook receiving holes 96, ribs 98 further connecting the walls to the outer surface of the lens, and the outer surface of the lens. The outer surface of the Fresnel lens in the left and right portion of the lens 92 is molded to a cylindrical shape whose radius is identical to the radius of the entire Fresnel lens 72 when installed in the front cover 74. When installed, the left and right portions 92 of the Fresnel lens 72 and the center portion 88 of the Fresnel lens will have the same radius R. The walls 94 are molded at such an angle that when the Fresnel lens 72 is bent to the final installed cylindrical shape, the two walls will be paralled and aligned with the direction of lens insertion into the front cover 74, thereby significantly simplifying the installation step.

The Fresnel lens 72 of the device 70 is bent into a curved conformation. This bending causes some tension along the edges 84 of the Fresnel lens, which are attached to the edges 108 of the front cover 74. This tension is reduced by the as molded cylindrical shape of the outer edges 92 of the Fresnel lens and the means by which the Fresnel lens 72 and the front cover 74 are connected.

The Fresnel lens 72 has a protruding wall 94 along its left and right edges 84, which contains hook receiving holes 96. When installed on the front cover 74, the holes 96 receive the complementary hooks or flanges 104 contained within lens wall receiving edge length slots 102 located in the front cover 74 along its edges 108. The wall 94 in the Fresnel lens 72 is located on an inner surface of the Fresnel lens 72. The hooks or flanges 104 of the Front cover 74 are similarly on its inner surface.

There are ribs 98 that connect the wall 94 to the inner surface of the Fresnel lens 72. These ribs 98 help insure the hook receiving holes 96 in the Fresnel lens 72 remain securely located on the hooks 104 in the front cover 74 and insure that the cylindrically molded edges 92 in the Fresnel lens remain in the as molded shape. Further, the walls 94, ribs 98 and cylindrically molded left and right portions 92 of the Fresnel lens form a very rigid structural configuration, insuring that residual stresses present at the left and right sides of center portion 88, once bent, will not influence the shape of the left and right regions 92. Therefore, the left and right edges 84 of the Fresnel lens 72 will remain cylindrical and in contact with the front cover 74 with no gaps, solving the deficiencies of the prior art. There are additional ribs 98 at the shorter edges 82 of the Fresnel lens, which shorter edges 82 are not involved in attaching the Fresnel lens 72 to the front cover. The additional ribs on the shorter edges help prevent tampering with the device 70.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be added to, or removed from the described embodiments.

The invention claimed is:

1. An apparatus comprising:
   a housing including a Fresnel lens and a front cover joined together at their respective edges;
   a pyroelectric detector contained within the housing; and
   a microcontroller in contact with the pyroelectric detector,
   wherein the front cover is complementary in size to the Fresnel lens,
   wherein the Fresnel lens includes a center portion, a first outer portion, and a second outer portion,
   wherein the center portion is molded as a flat plane and includes a unitary part that includes an array of Fresnel lens elements, wherein each of the first and second outer portions is molded to form a partial-cylinder portion having radius R, and wherein, when the Fresnel lens and the front cover are joined together at the respective edges, the center portion of the Fresnel lens bends such that the center portion and the first and second outer portions form a partial-cylinder outer surface extending from a first edge of the Fresnel lens to a second edge of the Fresnel lens and having radius R.

2. The apparatus of claim 1 wherein the Fresnel lens comprises high density polyethylene.

3. The apparatus of claim 1 wherein the front cover comprises a thermoplastic polymer material.

4. The apparatus of claim 1 wherein each of the first and second outer portions of the Fresnel lens comprises a wall that attaches to the front cover, wherein each wall protrudes from an inner surface of the Fresnel lens opposite the partial-cylinder outer surface.

5. The apparatus of claim 4 wherein each wall comprises hook receiving holes or slots, and wherein the front cover comprises complementary hooks or flanges that engage the hook receiving holes.

6. The apparatus of claim 4 wherein each wall further comprises ribs forming a connection to the Fresnel lens.

7. The apparatus of claim 4 wherein the Fresnel lens comprises ribs at third and fourth edges of the Fresnel lens, and wherein the third and fourth edges do not have the wall.

8. The apparatus of claim 4 wherein a final shape of an installed Fresnel lens is a partial cylinder of constant radius.

9. The apparatus of claim 4 wherein each wall comprises hooks or flanges, and wherein the front cover comprises complementary hook receiving holes or slots that engage the hooks.

10. The apparatus of claim 4 wherein, when the Fresnel lens is formed to a final installed shape, each wall is parallel and aligned in a lens insertion direction.

11. An apparatus comprising:
a housing including a rectangular front piece and a rectangular middle piece of matching dimensions joined along edges of respective longer sides to form an inner cavity within the housing and a rectangular back piece of matching dimensions;
a pyroelectric detector contained within the inner cavity; and
a microcontroller within the inner cavity,
wherein the microcontroller is in contact with the pyroelectric detector,
wherein the front piece comprises a curved surface that includes an array of Fresnel lens elements, and
wherein the middle and back pieces comprise a thermoplastic material.

12. The apparatus of claim 11 wherein the front piece comprises high density polyethylene.

13. The apparatus of claim 11 wherein the front piece and the middle piece snap together to facilitate manufacturing of the apparatus.

14. An apparatus comprising:
a housing including a Fresnel lens and a front cover joined together at respective edges;
a pyroelectric detector contained within the housing; and
a microcontroller in contact with the pyroelectric detector,
wherein the front cover is complementary in size to the Fresnel lens,
wherein the Fresnel lens includes a center portion, a first outer portion, and a second outer portion,
wherein the center portion is molded as a flat plane and includes a unitary part that includes an array of Fresnel lens elements,
wherein, when the Fresnel lens and the front cover are joined together at the respective edges, the center portion of the Fresnel lens bends such that the center portion and the first and second outer portions form a partial-cylinder outer surface extending from a first edge of the Fresnel lens to a second edge of the Fresnel lens, and
wherein each of the first and second outer portions of the Fresnel lens comprises a wall that attaches to the front cover such that each wall protrudes from an inner surface of the Fresnel lens opposite the partial-cylinder outer surface.

15. The apparatus of claim 14 wherein each wall comprises hook receiving holes or slots, and wherein the front cover comprises complementary hooks or flanges that engage the hook receiving holes.

16. The apparatus of claim 14 wherein each wall further comprises ribs forming a connection to the Fresnel lens.

* * * * *